Oct. 11, 1932.　　　E. P. GAINES　　　1,881,463
AIRFOIL
Filed March 7, 1930　　　3 Sheets-Sheet 1
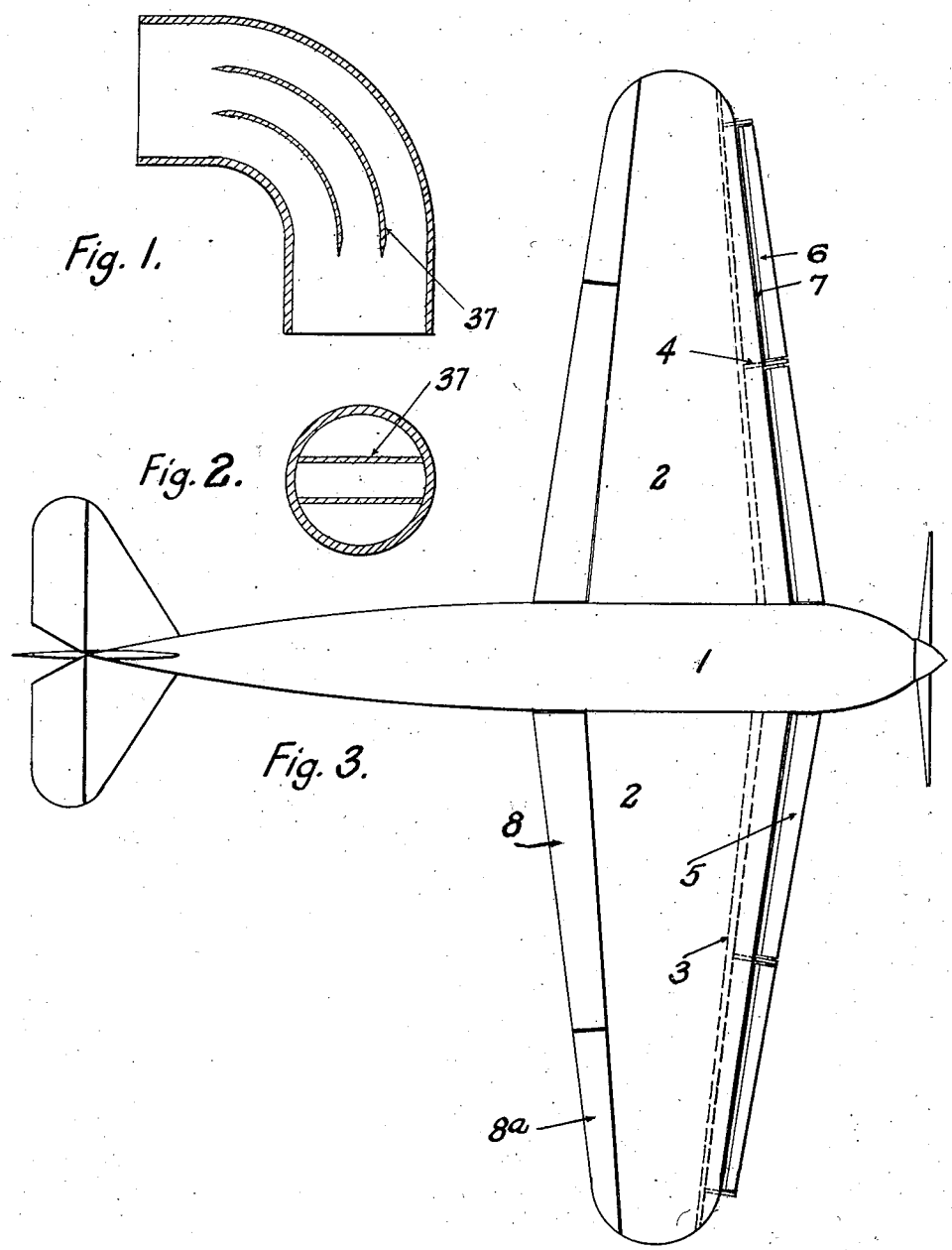
INVENTOR
BY
ATTORNEY

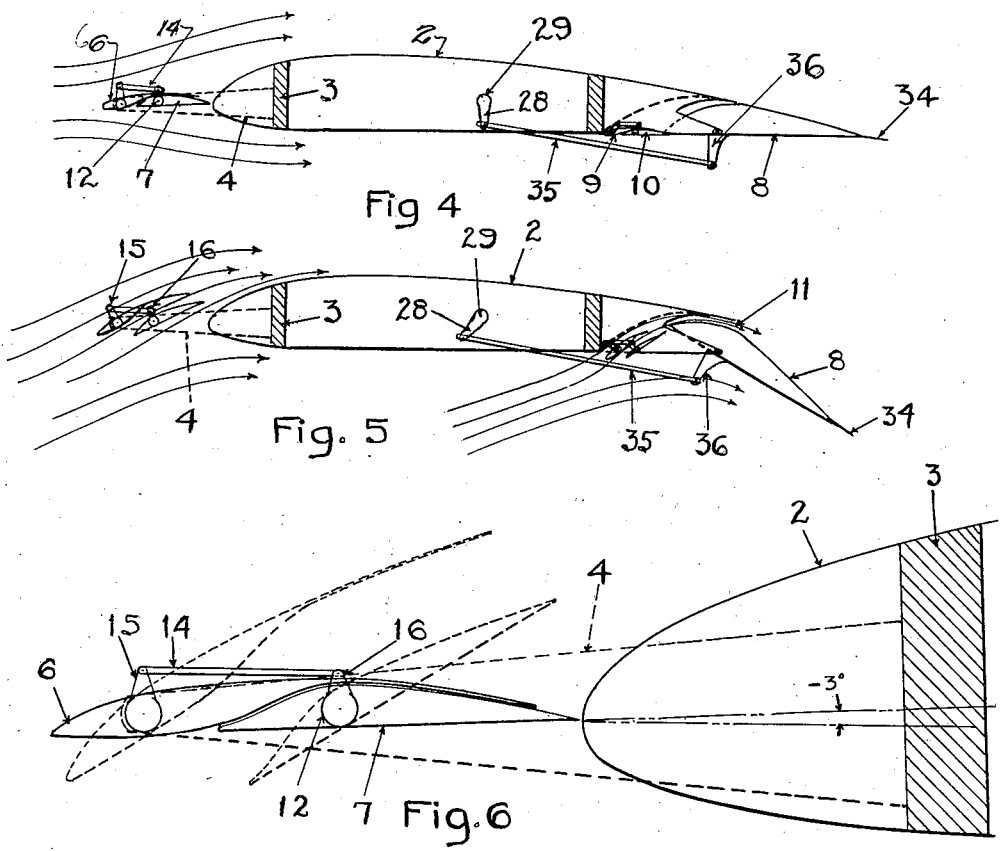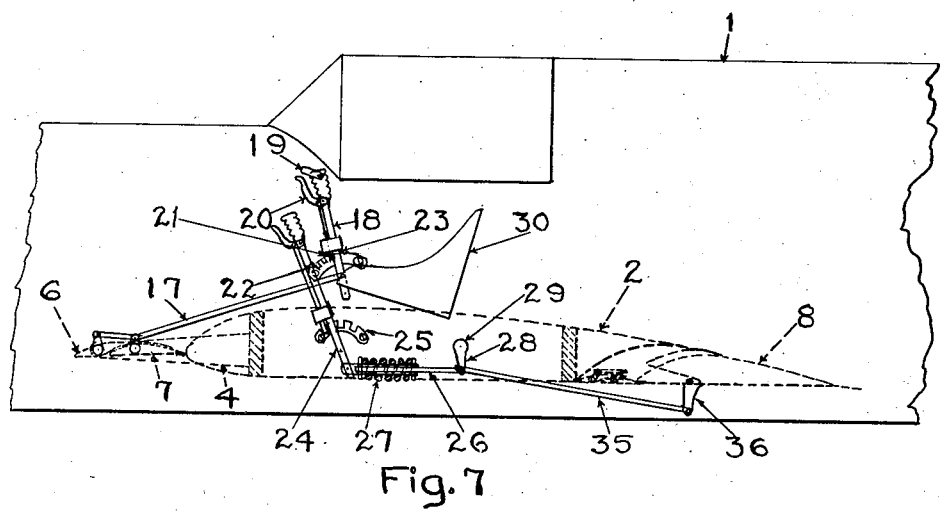

Oct. 11, 1932.  E. P. GAINES  1,881,463
AIRFOIL
Filed March 7, 1930  3 Sheets-Sheet 3
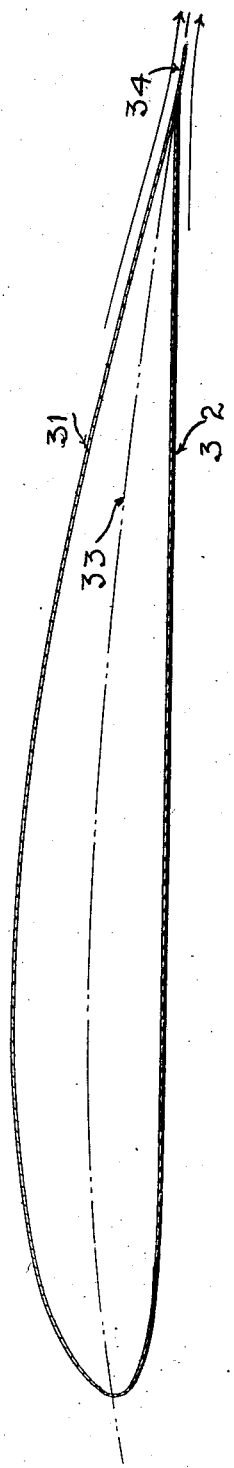
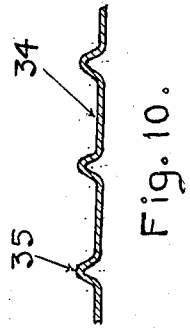
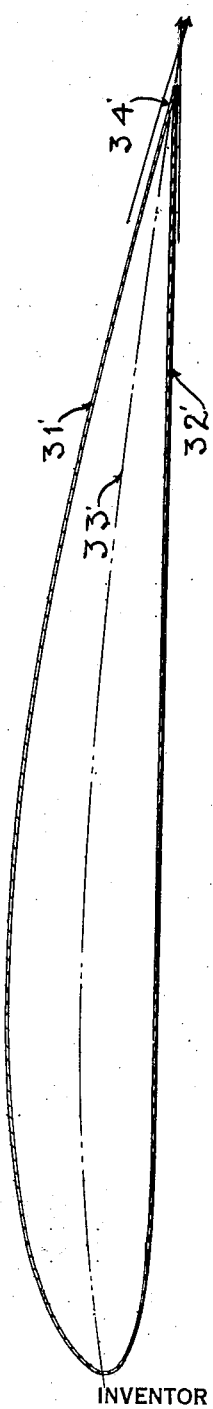
INVENTOR
Edmund P. Gaines
BY
W. E. Clark Jr.
ATTORNEY Patented Oct. 11, 1932

1,881,463

UNITED STATES PATENT OFFICE

EDMUND P. GAINES, OF COLUMBIA, SOUTH CAROLINA

AIRFOIL

Application filed March 7, 1930. Serial No. 433,864.

My invention relates to aircraft and more particularly to airfoils therefor.

It is known that when an airfoil is inclined at an angle to the air through which it is translated or which acts upon it, the lift coefficient of such airfoil increases with the increase of its angle of attack up to a certain critical angle which past experiments indicate varies from between 12° and 20°. After this critical angle is passed, the value of the lift coefficient of the airfoil decreases owing to the discontinuity of the air flow over the upper surfaces of the airfoil, which disturbed air flow, i. e., eddying air or vortices, is known as "burbling." When burbling begins the air ceases to exert its full suction effort and the lift coefficient rapidly falls off. Various devices have been suggested for increasing the angle of attack at which burbling begins.

One of the objects of this invention is to provide improved means whereby burbling of the main airfoil at high angles of attack is delayed.

A further object of the invention is to employ the anti-burbling mechanism to secure better climb and high altitude operation of the aircraft.

A further object is to provide for the operation of trailing edge flaps or ailerons on the main airfoil in conjunction with the anti-burbling mechanism.

Further objects are to provide means whereby the trailing edge flap will rise in a high speed dive to relieve the load on the rear wing beams and to provide a lighter and more efficient trailing edge for the main airfoils.

Further objects of the invention will be apparent from a consideration of this specification and claims and the accompanying drawings.

It is thought that a consideration of the flow of fluid through a pipe will aid in the understanding of my improved anti-burbling mechanism. According to a well known principle in hydraulics, in order to pass a maximum amount of fluid through a pipe containing bends or elbows, it is advisable to install curved partitions extending from wall to wall in the elbows to get the fluid around the curves. These partitions or vanes minimize turbulence in the bends and despite their skin friction cause a much greater volume of fluid to flow through the pipe. For maximum efficiency the number and spacing of these vanes varies according to circumstances, but always multiple vanes are used. To prevent burbling of an airfoil, maximum results are obtained by transmitting as much air as possible from the space below and forward of the nose of the airfoil to the dead air space or partial vacuum above the airfoil. To accomplish this, multiple curved vanes should be used to deflect the air around the nose of the main airfoil with the minimum of turbulence. Many forms of through slots extending along the leading edge have been proposed. Wind tunnel tests show that multiple slots, one behind the other, give a greater maximum lift than does a single slot. This is a result of the same principle as that of the curved vanes in the elbow of the pipe. The function of the curved through slots is to turn the air without turbulence around the curve of the nose of the main airfoil. Heretofore, through slots of this nature have been limited to one slot in practical applications, because of structural difficulties, and the difficulty of closing multiple through slots so as to avoid high drag at low angles of attack. I have invented and disclose herein a plan whereby all of the advantages of multiple through slots may be utilized at high angles of attack, and whereby the apparatus used may be so disposed as to cause small drag at low angles of attack.

Various plans have also been suggested whereby the single through slots are opened and closed automatically by air forces acting upon the structure surrounding them. Never before, however, has a plan been offered for the automatic operation of multiple through slots at the leading edge of the main airfoil. Moreover, the automatic through slots heretofore proposed serve mainly one function, i. e., to decrease landing speed of the aircraft. A quick take-off is almost as essential, and rapid climb and increase in operating altitude are two very desirable qualities. In the case of the so-called Handley-Page automatic through slot, as recently demonstrated in this country, a single slot is formed by an auxiliary airfoil moving forward under the influence of air pressure from its normal position against the nose of the main airfoil. The auxiliary airfoil does not extend to its full forward position until after about 12° of angle of attack has been passed. For the normal airplane, equipped with an average airfoil, whose gross weight runs between 10 and 18 lbs. per horsepower, and whose best climbing angles vary from 4° to 10° angle of attack, the auxiliary airfoil remains closed during take-off and climb. Since the auxiliary airfoil does not tend to increase the effective area, it is of little or no value during take-off, climb, and operation at altitude.

Another type of single through slot has also been proposed. This type of slot is formed by a single pivoted vane which is free to rotate under the influence of the air stream (within certain limits) and which is mounted in front of the nose of the main airfoil. During take-off and climb, this vane rotates in the air stream and causes a spillage of the air from the lower to the upper surfaces of the airfoil. Wind tunnel tests show that for the take-off and climbing angles of attack (4° to 10°, or even 12°) the open slot contributes nothing to the lift. So it is valueless during this stage of the operation.

The present invention contemplates, in addition to the multiple nose vanes, suitable control mechanism whereby said vanes may be either locked in any position of adjustment, or when released, made to operate entirely automatically under the influence of the air pressures acting on them. If locked in a closed position the effective area of the wing is increased about 14% and a proportionate gain in take-off, climb and flight at altitude is made possible. The vanes can also be locked in a fully open position in which position the airfoil can fly at higher angles of attack without burbling. It can also be locked at intermediate positions at which the lift of the airfoil will be increased for certain angles of attack. Preferably the control mechanism also includes suitable means for manually adjusting the setting of the trailing edge flap or flaps. With the flaps adjusted and the vanes locked, both the effective angle of attack and camber may be varied simultaneously with an effective increase in wing area. Although the front shutter arrangement illustrated shows but two vanes inter-connected, a greater number of vanes can be employed if desired.

Wind tunnel tests also show that at high angles of attack the lift of the main airfoil is increased by allowing a transfer of air from the lower surface to the upper surface through a slot just forward of the nose of the trailing edge flap or flaps. Usually, a fixed gap is left between the nose of the trailing edge flap and the main airfoil. This has the disadvantage of high drag at low angles of attack. In the present invention, the gap is so arranged that it will be closed when the trailing edge flap is raised. The gap is closed on the lower side of the main airfoil by shutter vanes similar to the vanes arranged at the nose of the airfoil and is closed on the upper side of the main airfoil by suitable design of the nose of the trailing edge flap so that it co-acts with the thin edge rearward continuation of the main airfoil. When the trailing edge flap is lowered the air gap is opened between it and the main airfoil and the suction on the upper surface creates an air flow tending to draw air from the under surface to the upper surface through said gap. Under the influence of the air thus directed the shutter vanes beneath the wing are caused to rotate thus completing the air gap and causing the air to flow through the gap without turbulence.

It is common practice to construct a lifting airfoil with the upper and lower surface thereof converging at the trailing edge, and usually the trailing edge is quite blunt, the outer contour forming a small semi-circle. This blunt trailing edge is inefficient, causing an increased drag and, furthermore, the air streams from the upper and lower surfaces converge and cross just aft of the trailing edge, leaving a turbulent wake. I propose, therefore, to construct the trailing edge of the lifting airfoil in such a manner that the contours of the upper and lower surfaces thereof will lie parallel, or approximately so, to one another and will extend the mean camber line in any desired direction. The length of the chord of the airfoil formed thus will be sufficient to cause the upper and lower air streams to flow off the airfoil approximately parallel to one another. The extreme tip of the trailing edge is very thin so as to reduce drag. The construction is very simple. It can be made of a single thickness of material, stiffened at intervals by ribs or beads parallel to the air flow, or it can consist of two or more layers of material, the layers being approximately parallel one to the other. The thin trailing edge should be as rigid as possible so that it will transmit its load to the trussed ribs, (not shown) forward. Where the upper and lower surfaces of the airfoil are composed of ribbed or corrugated metal, and the corrugations lie parallel to the direction of flight, the object in view is accomplished by allowing the upper or lower surface to overhang the other surface by the desired amount. The overhanging portion is bent to the desired contour.

In order to explain the invention more clearly, I have illustrated it in the accompanying drawings wherein like reference characters denote like or corresponding parts.

Figs. 1 and 2 are cross sections of a pipe elbow containing vanes for eliminating turbulence in the flow of fluid at the bend. Such illustrations are merely included to show a well known principle of fluid flow;

Fig. 3 is a top view of a monoplane embodying this invention;

Fig. 4 is a cross section of an airfoil used on the airplane shown in Fig. 3 set for high speed;

Fig. 5 is a cross section of the airfoil in landing attitude;

Fig. 6 is a large scale section of the nose of the main airfoil and the nose vanes;

Fig. 7 is a cross section of the fuselage showing the pilot's seat and the control levers to the nose vanes and to the trailing edge flap;

Fig. 8 is a cross section of an airfoil illustrating more clearly my improved trailing edge;

Fig. 9 is a cross section of an airfoil illustrating the usual type of trailing edge; and Fig. 10 is an enlarged cross section of the thin trailing edge portion of the airfoil shown in Fig. 8.

Referring to Fig. 3 I have shown an airplane equipped with a fuselage 1 and wings 2.

I provide auxiliary airfoils positioned in front of the main wings 2. Mounted on the front wing beams 3 (shown in dotted lines in Fig. 3) are brackets 4 which extend forward of the leading edge of said wings. Pivotally mounted on the brackets 4 are a series of auxiliary airfoils or vanes 6 and 7. These vanes are pivoted for limited rotation about axes extending transverse of the line of flight and are pivoted at points about 25% of their chord back of their leading edges. They thus form a shutter arrangement forward of the leading edge of the wings. When the shutter is closed (see Fig. 4) it forms a body of airfoil shape, whose major axis is parallel to the slip stream in such a position as to offer minimum drag at high speed.

Means are provided to insure that all of the vanes of the series shall act in unison. The axis 12 of the rear vane 7 is a torque tube which runs the entire length of the wing 2. This torque tube also forms the beam of the vane and a similar torque tube may be provided for the vane 6. Lever arms 15 and 16 are secured to the beams of vanes 6 and 7 and are connected through links 14. The relation of the rotation of both vanes with respect to each other is determined by the length of the arms 15 and 16.

Means are provided for manually moving the vanes from the position shown in Fig. 4 to the position shown in Fig. 5 and from the position shown in Fig. 5 to the position shown in Fig. 4. This means may also serve to move the vanes to and from intermediate positions. Means are also provided for locking the vanes at any selected one of these positions. Extending rearwardly (Fig. 7) from the arm 16 is a connecting rod 17 which is secured at its rear end to an operating lever 18. The operating lever 18 is provided with a pawl or dog 21 which is adapted to be inserted in any one of a plurality of notches formed in a locking quadrant. A release handle 20 is provided for withdrawing the dog 21 from the locking notches and suitable spring means may be provided if desired to urge the dog into the locking notches. A latch 19 is provided adjacent to the release handle 20 so that the release handle may be maintained at times with the dog 21 removed from the notches so that the operating lever 18 is capable of free movement, and so that the vanes 6 and 7 will be operated entirely automatically by the influence of the air stream acting upon them. A stop 22 is provided adjacent the front end of the quadrant to limit the rotation of the vanes 6 and 7 so that they may not rotate beyond the position shown in Fig. 5. A stop 23 is provided adjacent the rear end of the quadrant to limit the opposite rotation of the vanes 6 and 7 to the position shown in Fig. 4 which is the position of least drag for maximum cruising speed.

I provide a trailing edge flap 8 which may be moved from the position shown in Fig. 4 to the position shown in Fig. 5 to increase the effective camber of the main wing. I also provide ailerons 8ª.

I desire when the flap 8 is in the position shown in Fig. 5 that a slot shall be provided just forward of the nose of the trailing edge flap in order that the greatest advantage may be obtained from said trailing edge flap. However, I desire that when the trailing edge flap is in the position shown in Fig. 4 which is the high speed position, that said slot shall be closed. To this end I so shape the nose of the trailing edge flap 8 and the rearward extension of the main airfoil 2 and so position the pivot of the trailing edge flap 8 that when the flap 8 is in the position shown in Fig. 4 the two shall contact and close the upper part of the slot. However, when the trailing edge flap 8 is in the position shown in Fig. 5 the trailing edge flap is spaced from the adjacent rear edge of the main airfoil to form a through slot. I also provide small pivoted vanes 9 and 10 for the purpose of closing the lower part of said slot when the trailing edge flap 8 is in the position shown in Fig. 4. The nose of the trailing edge flap 8 contacts with the rear edge of the rear vane 10 and maintains it in the high speed condition in the position shown in Fig. 4. The vanes 9 and 10 are inter-connected by a linkage similar to the linkage 14, 15 and 16 of the front vanes, so that all vanes move simultaneously. However, when the trailing edge flap 8 is moved to the position shown in Fig. 5 the air stream passing through the slot 11 causes the vanes 9 and 10 to move to the position shown in Fig. 5 so that the lower part of the slot 11 is substantially open.

Means are provided for manually moving the trailing edge flap from the position shown in Fig. 4 to the position shown in Fig. 5 and from the position shown in Fig. 5 to the position shown in Fig. 4. Positioned adjacent to the lever 18 (Fig. 7) is an operating lever 24 connected at its lower end to a pull rod 26. The rear end of the pull rod 26 is connected to one of a plurality of similar arms 28 secured to a torque tube 29. The arms 28 are spaced along the torque tube 29 and each has also fastened at its lower end a link 35 which extends rearward and is connected to the lower end of one of the downwardly extending arms 36 fastened to the flap 8. It may thus be seen that the moving backward of the lever 24 causes a downward movement of the flap 8 and that the moving forward of the lever 24 causes the flap 8 to return to the position shown in Fig. 4.

Means are provided to prevent the breakage of parts due to the imposition of too high loads upon the trailing edge flap 8, such as may occur in a dive, for instance. The pull rod 26 is in reality a pair of telescoping tubes connected by a strong spring 27 so that it normally acts as a unitary tube, but so that it may when excessive loads are imposed upon the flap 8 compress to allow the flap 8 to move from the position shown in Fig. 5 toward the position shown in Fig. 4.

Means are provided for locking the lever 24 and the trailing edge flap 8 in the position shown in Fig. 4 or the position shown in Fig. 5 or in designated inter-mediate positions. As shown in Fig. 7, there is provided a quadrant 25 formed with a plurality of notches into which a dog or pawl similar to the dog 21 is adapted to be inserted and there is also provided a release handle by which the dog may be withdrawn from the notches. A seat 30 is provided adjacent the levers 18 and 24 for the pilot.

As shown in Figs. 4, 5 and 7 the rear edge of the main wing 2 is formed of a single sheet of metal so that as little disturbance and turbulence as possible may be created by the flow of the air streams, one of which flows over the top of the main wing and one of which flows through the slot 11. A similar construction is used along each edge of the flap 8 and this type of construction is illustrated more clearly in Figs. 8 and 9. In Fig. 9 is shown a wing of ordinary construction in which the upper sheet 31' and the lower sheet 32' are joined as at 34' to form a comparatively blunt trailing edge so that the air streams passing over and under the wing cross each other as shown by the arrows and create turbulence and eddies. However, in the wing shown in Fig. 8 the upper sheet 31 is continued beyond the rear edge of the lower sheet 32 and overhangs said lower sheet, so that the air streams continue substantially parallel to each other as shown by the arrows in Fig. 8. This overhang of the upper sheet 31 is designated 34 and as shown in Fig. 10 is provided with a plurality of corrugations 35 which transmit the load from the trailing edge 34 to the main rib truss. Thus, additional area is gained without paying the full price of wing drag and weight such as would be caused by a double layer of metal. Moreover, by the use of a single sheet, it is possible to obtain a much thinner trailing edge and as demonstrated above to cause the air streams to flow substantially parallel to each other and reduce turbulence. The mean camber lines of the wings are designated respectively 33 and 33'.

The operation of the airplane illustrating my invention is as follows: Consider the pilot seated in the seat 30 ready to make a cross country flight from a small field. He sets the lever 18 in the position which locks the vanes 6 and 7 in the most efficient position for climbing, which may be the position shown in Fig. 7. He sets the lever 24 in one of the intermediate notches of the quadrant 25, depressing the flap 8 about 15°, and takes off. After reaching the desired altitude, he sets the lever 24 in the forward notch, raising the flap 8 to its uppermost position. In moving the flap 8 from the position shown in Fig. 5 to that of Fig. 4 the nose of the flap 8 contacts with the rear edge of the vane 8 and causes it to move to the position shown in Fig. 4. The movement of the vane 10 thru the linkage, causes a corresponding movement of the vane 9. This movement of the flap 8 to the position shown in Fig. 4 reduces drag to a minimum and the drag is further lowered by the increased efficiency of the thin rigid trailing edge member 34. Therefore, the efficiency of the airfoil at cruising and high speeds is relatively high. Presently the pilot may encounter low visibilty and fog and must descend to a low altitude to follow his course. To obviate an unexpected stall near the ground, he pulls the release lever 20 back and clamps it by means of the catch 19. This makes the lever 18 full floating and vanes 6 and 7 can act automatically. In case of a stall, their trailing portions move upward until the dog 21 contacts with the stop 22, thus forming a plurality of nose slots because of which the airplane may be flown at much higher angles of attack without stalling. Should ice begin to form on the shutter vanes 6 and 7, the pilot may give the lever 18 an occasional vigorous shake to keep the pivots free. When the pilot approaches his destination, he sets the lever 24 in the rear notch of the quadrant 25 thus lowering the flap 8 to its limit and opening the air gap 11. The rear shutter vanes 9 and 10 rotate automatically to permit the flow of air shown in Fig. 5. The pilot may allow the lever 18 to float freely or he may lock it in the forward notch, thus locking the vanes 6 and 7 with the front slots open. He will probably elect to do the latter, inasmuch as he can then nose the plane down at a relatively slow speed on account of the high drag offered by the open nose vanes. In case the plane, in a dive with the flap 8 down, should attain a speed in excess of a pre-determined amount, the spring 27 compresses, allowing the tube 26 to lengthen and allowing the flap 8 to ride up to avoid overloading the rear beam. It is to be noted that at low angles of attack, with the flap down, the center of pressure shifts rearward.

Figs. 1 and 2 illustrate a conventional arrangement of curved partitions 37 in a pipe by means of which it is possible to increase the flow of liquid through the pipe.

While I have described my invention in detail in its present embodiment, it will be obvious to those skilled in the art after understanding my invention, that various changes and modifications may be made therein without departing from the spirit or scope thereof. I aim in the appended claims to cover all such modifications and changes.

I claim as my invention:

1. An airfoil having its mean camber line extended at the trailing edge by a thin substantially rigid member having its opposite surfaces substantially parallel.

2. An airfoil having its mean camber line extended at the trailing edge by a thin substantially rigid member having its opposite surfaces substantially parallel together with means for transmitting the loads imposed on said member to and into the structure of said airfoil.

3. An airfoil constructed of a pair of spaced plates, the plates contacting with each other at the rear end of one of the plates, and the other plate having a substantially rigid portion extending backward from the point of contact.

4. An airfoil constructed of a pair of spaced plates, the plates contacting with each other at the rear end of one of the plates and the other plate having a substantially rigid portion extending backward from the point of contact and having a plurality of corrugations formed in the extended part thereof to extend substantially parallel to the normal direction of air flow thereover.

5. In an airplane, an airfoil composed of a main section and a plurality of auxiliary sections positioned in front of said main section being all mounted wholly in advance of said main section, the auxiliary sections being automatically movable from positions in which a plurality of slots are formed between them and between one of them and the main section to positions in which the slots are closed and in which the auxiliary sections form a single airfoil wholly in advance of the main section and arranged substantially parallel to the relative air stream, and also being automatically movable from the positions in which the slots are closed to the positions in which the slots are open.

6. An airfoil composed of a main section and a rear flap mounted adjacent to said main section, means for manually controlling the position of said rear flap, a plurality of pivoted auxiliary airfoils also positioned adjacent to the rear part of said main section, the auxiliary airfoils being automatically movable upon movement of said rear flap to open and close a slot between said main section and said rear flap.

In testimony whereof I hereunto affix my signature.

EDMUND P. GAINES.